Aug. 14, 1951      E. L. ERB      2,563,803
MACHINE FOR TRIMMING BUSHINGS
Filed Sept. 25, 1946
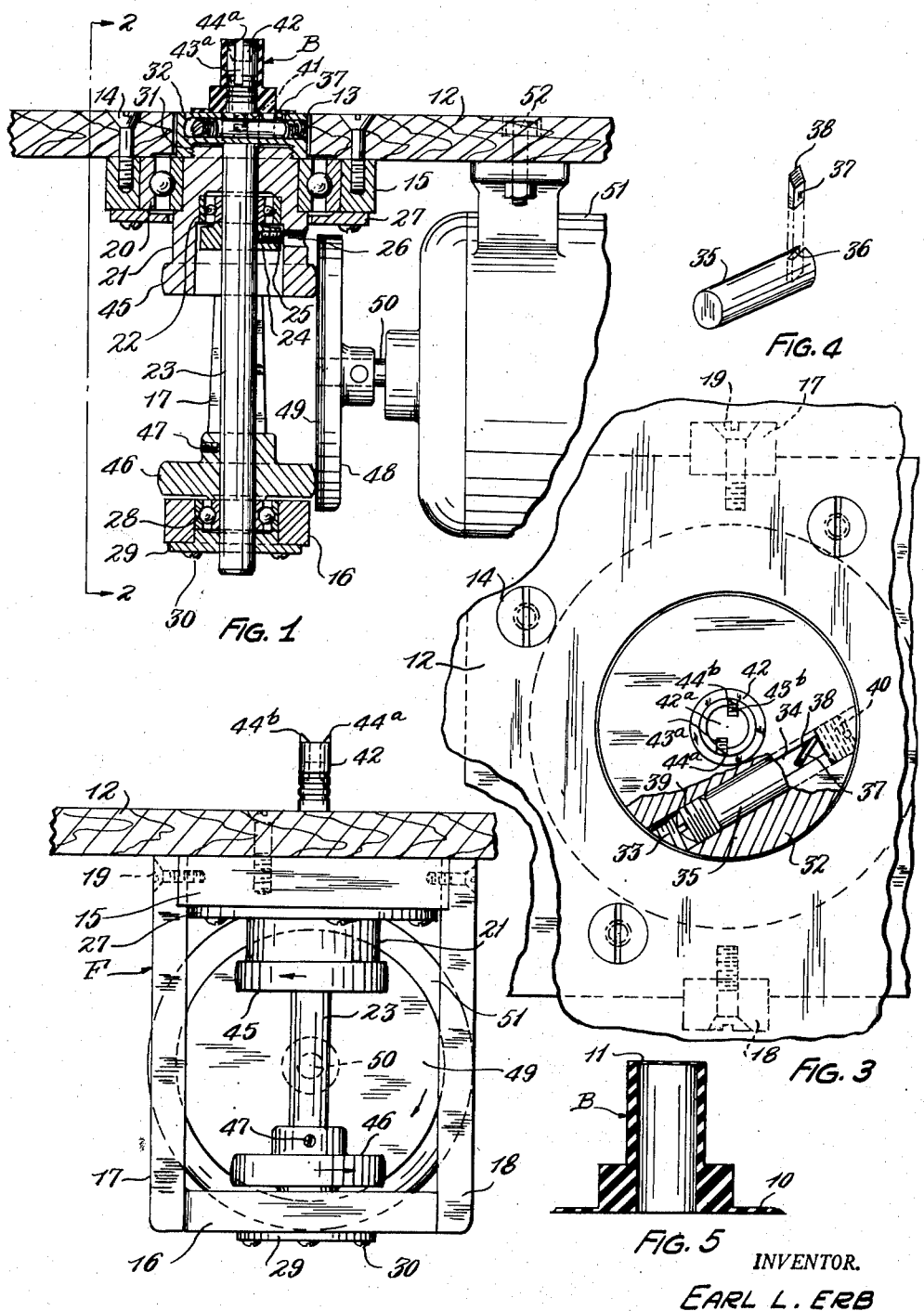
INVENTOR.
EARL L. ERB
BY
Kwis, Hudson, Boughton & Williams
ATTORNEYS Patented Aug. 14, 1951

2,563,803

UNITED STATES PATENT OFFICE 2,563,803

MACHINE FOR TRIMMING BUSHINGS

Earl L. Erb, Cleveland, Ohio, assignor, by decree of court, to Edith Agnes Erb

Application September 25, 1946, Serial No. 699,166

8 Claims. (Cl. 164—60)

This invention relates to a machine for trimming bushings or the like, and more particularly to a machine for removing flashings from molded or cast bushings formed of rubber or like materials.

Bushings or like articles formed from rubber and similar materials are generally produced by casting or molding. The articles thus produced normally have a certain amount of extraneous material, commonly termed flashings, attached thereto which must be removed before the articles can be used. Heretofore these flashings have been removed by laborious and time consuming hand operations which greatly increased the cost of the bushings or like articles and retarded the production thereof.

It is, therefore, an object of this invention to provide a novel machine adapted to trim flashings from cast or molded bushings or like articles in a more rapid and efficient manner thereby greatly increasing the production of the bushings or like articles.

Another object of the invention is the provision of a novel machine adapted to rapidly and accurately trim a plurality of flashings from cast or molded bushings or like articles in a single operation, the machine being so constructed and arranged that it may be utilized by an unskilled worker.

A further object of the invention is to provide a novel and improved machine for removing material from a workpiece, the machine comprising two rotatable members each carrying a material removing means adapted to engage different portions of the workpiece, the members being driven simultaneously in opposite directions to equalize the torque exerted upon the workpiece by the material removing means.

A still further object of the invention is to provide a novel and improved machine for removing material from a workpiece, the machine comprising two rotatable members journaled for rotation about a common axis with each member carrying a material removing means adapted to engage different portions of the workpiece, the members being driven simultaneously in opposite directions, and means being provided to adjust the speed of one member relative to that of the other whereby the torque exerted upon the workpiece by one of the material removing means may be balanced by the torque exerted by the other of the material removing means.

An additional object of the invention is to provide an improved machine of the character described in the two preceding objects with means to adjust and/or replace the material removing means to adapt the machine for operation upon workpieces of different sizes.

It is also an object of the invention to provide a novel machine for trimming flashings from cast or molded bushings or the like, the machine comprising a supporting frame in which a rotatable member is journaled and provided with a cutter for engaging and removing a flashing on a bushing, the rotatable member having a shaft journaled therein and provided with a second cutter for cooperation with a second flashing on a different portion of the bushing, the shaft and member being rotated simultaneously in opposite directions whereby the torque exerted upon the bushing by one cutter is balanced by the torque exerted thereon by the other cutter; the machine also including means to adjust the speed of rotation of the shaft relative to the rotatable member and means to adjust and/or replace the cutters whereby the machine may be adapted for operation upon bushings of different sizes.

The invention further resides in certain novel features, details of construction and combinations and arrangements of parts; and further objects and advantages thereof will be apparent to those skilled in the art to which it pertains from the following description of the present preferred embodiment thereof described with reference to the accompanying drawing in which similar reference characters represent corresponding parts throughout the several views and in which:

Fig. 1 is a fragmentary sectional view taken substantially longitudinally through the center of the novel machine with certain parts shown in elevation to more clearly reveal the construction and with a bushing, which is to be trimmed, positioned on the machine;

Fig. 2 is a side elevational view of the novel machine with the upper support shown in section, the view being taken substantially on the line 2—2 of Fig. 1 and looking in the direction indicated by the arrows, the bushing which is to be trimmed not being shown;

Fig. 3 is a fragmentary top elevational view of the novel machine illustrated in Figs. 1 and 2 with portions broken away and others shown in section;

Fig. 4 is a detached view of one of the cutters and the holder therefor which are employed in the novel machine;

Fig. 5 is a longitudinal sectional view through a cast or molded bushing showing the flashings thereon which are removed by operation of the novel machine.

Bushings and like articles formed from rubber and similar materials are conventionally produced in sheets by casting or molding. The individual bushings are then separated and have an appearance, in cross section, similar to that designated B in Fig. 5. It will be seen that the bushing B has two flashings 10 and 11 which constitute extraneous material and which, respectively, united the individual bushings as cast or molded and covered an end of the mold of each bushing. These flashings must be removed before the bushing is placed in use, and heretofore it has been necessary to effect this removal by laborious hand operations which greatly increased the cost of the bushings and retarded production thereof. The machine of the present invention, while not limited thereto, is primarily designed for removing these flashings from rubber bushings, or the like, in a manner which will hereinafter become apparent.

As shown in the drawings, and in particular in Figs. 1 and 2 thereof, the novel machine comprises an upper support 12, which may be the top of a work bench or the like. This support 12 is provided with a suitable cylindrical opening 13 for a purpose hereinafter described. Secured to the underside of the support 12, as by means of suitable screws 14 or the like, is a frame generally designated F. This frame comprises an upper plate or supporting member 15 provided with a large cylindrical opening which is located coaxially with the opening 13 in the support 12. The frame F further comprises a lower supporting member or plate 16 provided with a cylindrical opening of smaller diameter than that in the plate 15 and located coaxially therewith. The lower plate or supporting member 16 is either integral with or attached to spaced vertically extending upright members 17 and 18, the upper ends of which are received in recesses on opposite sides of the upper plate or supporting member 15 and connected thereto by suitable means, such as screws 19.

Disposed within the cylindrical opening in the upper plate 15 of the frame is an anti-friction bearing 20, which is preferably of the ball type, having its outer race fitted within the said cylindrical opening of the plate 15 and its inner race mounted upon a reduced diameter portion of a rotatable member 21. The rotatable member 21 is further provided with a cylindrical bore extending axially therethrough, the lower end of the bore being countersunk and provided with an anti-friction bearing 22, preferably of the ball type. A second rotatable member, which is here illustrated as a shaft 23, extends through the bore in member 21 and through the bearing 22 and is journaled by the latter for rotation relative to the member 21. Rotatable members 21 and 23 are maintained in predetermined axial relationship by a collar 24 surrounding the rotatable member or shaft 23 and abutting the lower surface of the bearing 22, the collar 24 being provided with a set screw 25 for clamping the collar to the shaft and there being an opening 26 through the side wall of the member 21 to afford access to the set screw 25. A plate 27, secured to the lower surface of the plate or supporting member 15 by screws or the like, maintains the bearing 20 and hence the rotatable member 21 within the cylindrical opening of the supporting plate 15.

The lower end of the rotatable member or shaft 23 extends through the opening or bore in the lower supporting plate 16 of the frame F and an anti-friction bearing 28, preferably of the ball type, has its inner race mounted on the shaft 23 and its outer race fitted in the opening in plate 16 to journal and support the shaft therein. A retaining bushing or plate 29 is secured by screws or similar fastening devices 30 to the lower surface of the supporting member 16 for retaining the bearing 28 within the said supporting member.

The rotatable member 21 has a portion 31 of reduced diameter extending above the top of the bearing 20 and provided with external threads for securing thereto a cap-like member 32 for rotation therewith. This cap 32 (see Fig. 3) is provided with a centrally located bore through which the shaft 23 extends, the top surface of the shaft and of the cap 32 being preferably coplanar with respect to each other and the top of the table or support 12. The cap member 32 is also provided with a bore or similar opening 33 extending at one side of the axis of the cap member, parallel with and spaced below the top surface thereof. The top surface of the cap 32 is provided with a slotted opening 34 communicating with a portion of the bore 33 for a purpose which will hereinafter become apparent.

Disposed within the bore 33 is a material removing or cutting tool holder or carrier 35 (see also Fig. 4), which may be cylindrical and has a sliding fit within said bore. One end of the holder 35 is provided with a slotted opening 36 extending from one end of the holder angularly with respect to the axis thereof. Disposed within this slotted opening 36 is a material removing member or cutter 37 of any suitable tool material and preferably shaped to provide a cutting edge 38 which extends through the opening 34 in the top surface of the cap member 32 (Figs. 1 and 3). The outer ends of the bore 33 are threaded and are provided with set screws 39 and 40 respectively, the inner ends of which abut the opposite ends of the tool holder 35. Hence, by advancing and retracting the set screws 39 and 40 within the bore 33, the holder 35 and the cutter 37 carried thereby may be shifted so as to dispose the cutting edge 38 at different radial distances from the center of the cap member for a purpose about to be described.

The upper end of the shaft 23 is provided with means for receiving and securing the end 41 of a removable member or post 42. For this purpose the end 41 of post 42 may be threaded and the upper end of shaft 23 provided with a correspondingly threaded opening. The post 42 has an external diameter and a longitudinal length of values such that it may be slidingly inserted within the interior of a bushing B with the top surface of the post substantially adjacent the top flashing 11. The top of the post 42 is provided with one or more material removing means, the machine here illustrated having two such means 43a and 43b positioned diametrically opposite each other and suitably secured to the post 42. The material removing means are formed from suitable tool material and have their upper ends formed to provide cutting edges 44a and 44b, respectively. These cutting edges are so positioned that, when a bushing B is sleeved over the post 42 in the manner shown in Fig. 1, the cutting edges will contact the flashing 11 closely adjacent the side walls of the bore of the bushing. Moreover, when the bushing is so positioned, the knife edge 38 of the material removing member or cutter carried by the cap member 32 engages the flashing 10 adjacent the outer periphery of the flange on the lower portion of the bushing B.

The construction of the machine is such that if the cap member 32 and the post 42 be rotated while the bushing B is held stationary, the knife edges 38, 44a and 44b will remove the flashings 10 and 11 from the bushing B. The top of the post 42 may be provided with a recess 42a, if desired, into which the flashing 11 may drop as it is severed from the bushing. This cutting operation, if the cutter 37 be rotated in the same direction as the cutters 43a and 43b, would produce considerable torque upon the bushing B, which would have to be resisted by the operator holding the bushing. In order to overcome this difficulty, the cutters carried by the two rotatable members in accordance with this invention are rotated in opposite directions and at speeds such that the torque exerted upon the bushing or other workpiece by one cutting means is substantially counterbalanced by the torque exerted upon the workpiece or bushing by the other cutting means. This is accomplished in the present machine by providing the lower end of the rotatable member 21, to the upper end of which the cap 32 is attached, with a circular flange 45 constituting a friction gear. Adjustably attached to the other rotatable member or shaft 23, intermediate the rotatable member 21 and the bearing 28, is a second friction gear 46, which is held in adjusted position upon the shaft by a set screw 47. Cooperating with the periphery of the friction gears 45 and 46 is a driving friction gear or disk 48, the face of which is provided with rubber 49 or other material for preventing slipping between the gear 48 and the gears 45 and 46.

The driving gear or disk 48 is connected to a shaft 50 of an electric motor or other rotation producing means 51, which is attached to the underside of the bench or upper support 12 by suitable connecting bolts 52. It will be apparent that when the motor 51 is rotating the friction gear or disk 48, the friction gears 45 and 46 will be rotated in opposite directions, as represented by the arrows in Fig. 2, thereby rotating the rotatable members 21 and 23 in opposite directions so that the cutters carried by these respective rotatable members likewise rotate in opposite directions. The position of the friction gear 46 is adjusted longitudinally of the rotatable member or shaft 23 such that, when the bushing B is positioned upon the post 42 and the disk 48 is rotated, the torque exerted upon the bushing by the cutting means will be balanced, one by the other, so that the operator need not exert any appreciable force in retaining the bushing against rotation.

When it is desired to employ the apparatus for removing flashings from bushings of a different size, the post 42 and the cutter or cutters carried thereby may be readily removed from the threaded opening in the shaft 23 and a new post and cutter assembly of appropriate size substituted therefor. The position of the cutting edge 38 carried by the rotatable member 21 is also adjusted to a proper position for the new bushing by adjusting the cutter holder 35 within the bore 33 by means of the set screws 39 and 40, the cap member 32 being readily removable from the threaded portion 31 of the rotatable member 21 to permit this adjustment.

It is believed that the construction of the present preferred form of the novel machine of this invention will now be readily apparent from the above detailed description. The operation thereof may be briefly summarized as follows. The machine is adjusted for trimming a bushing by providing a post and cutter assembly of proper size upon the upper end of the shaft 23, adjusting the location of the cutting edge 38 to cooperate with bushings of the size which are to be trimmed and adjusting the friction gear 46 to a position such that the torque produced upon the bushing by one cutting means is balanced by the torque produced by the other cutting means. Thereafter, with the motor 51 in continuous operation, the operator has only to sleeve a bushing B over the post 42 to the position shown in Fig. 1 and momentarily hold it in that position. The knife edges 38, 44a and 44b will then quickly and cleanly sever the flashings 10 and 11 from the bushing which may then be removed and another bushing applied in place thereof. Since the two cutting means rotate in opposite directions and the speeds thereof are adjusted so that the torque exerted by one cutter is balanced by that exerted by the other, the bushing is not twisted by the cutting operation. Hence, the removal of the flashings is accomplished with a minimum effort on the part of the operator, since he need not exert any force to prevent rotation of the bushing during the cutting operation.

While the invention has been described in considerable detail with respect to removing flashings from bushings or like articles formed of rubber or similar materials, it will be apparent that the machine may be employed for effecting similar operations upon workpieces of other materials and configurations by slight modifications in the location and type of cutters employed. Other advantages, adaptations, and modifications of the invention will readily suggest themselves to one skilled in the art, and the invention is, therefore, not to be considered as limited to the exact construction here illustrated and described but only by the spirit and scope of the appended claims.

Having thus described my invention, I claim:

1. A machine for trimming flashings from cast or molded bushings or the like, the machine comprising two rotatable members journaled for rotation about a common axis, removable means carried by one of said members for positioning a bushing thereon, a cutter carried by said means and adapted to engage a flashing on a bushing positioned on said means, a second cutter carried by the other of said rotatable members and adapted to engage a second flashing on a bushing when the latter is positioned on said means, and means to simultaneously rotate said members in opposite directions in a manner such that the torque exerted upon said bushing by one of the cutters is balanced by the torque exerted upon said bushing by the other of said cutters.

2. A machine as defined in claim 1 and further comprising means to adjust the position of the second cutter for operation upon bushings of different sizes, the said removable means being adapted to cooperate with bushings of only one size and being interchangeable with a like means of proper size whenever a bushing of different size is to be operated upon.

3. A machine for trimming flashings from cast or molded bushings or the like, the machine comprising two rotatable members, means carried by one of said members for positioning a bushing thereon, a cutter carried by said means and adapted to engage a flashing on a bushing positioned on said means, a second cutter carried by the other of said rotatable members and adapted to engage a second flashing on a bushing when the latter is positioned on said means, means to adjust the position of the second cutter, means to simultaneously rotate said members in opposite directions, and means to adjust the speed of rotation of one of said members whereby the torque exerted upon said bushing by one of the cutters may be balanced by the torque exerted upon the bushing by the other of the cutters.

4. A machine for trimming flashings from cast bushings or the like, the machine comprising two rotatable members journaled for rotation about a common axis, means carried by one of said members for positioning a bushing thereon, a cutter carried by said means and adapted to engage a flashing on a bushing positioned on said means, a second cutter carried by the other of said rotatable members and adapted to engage a second flashing on a bushing positioned on said means, means to adjust the position of the second cutter, a single driving member cooperating with both of said rotatable members to simultaneously rotate said members in opposite directions, and means to adjust the speed of rotation of one of said rotatable members relative to the speed of the other of said rotatable members whereby the torque exerted upon said bushing by one of the cutters may be balanced by the torque exerted upon the bushing by the other of said cutters.

5. A machine for trimming flashings from cast bushings or the like, the machine comprising a supporting frame, a rotatable member journaled in said frame, a shaft journaled in said member coaxially thereof, separate cutters carried by said member and shaft and adapted to engage the flashings on a bushing and sever them therefrom, means to adjust the position of the cutter carried by said rotatable member, a single driving member cooperating with said shaft and rotatable member for simultaneous rotation thereof in opposite directions, and means to adjust the speed of rotation of said shaft relative to the speed of the rotatable member whereby the torque exerted upon said bushing by one of the cutters may be balanced by the torque exerted upon said bushing by the other of said cutters.

6. A machine as defined in claim 5 in which the cutter carried by said shaft is mounted upon a member adapted to be inserted into the hollow interior of a bushing and means are provided to detachably secure the last-mentioned member to the shaft, whereby the member secured to said shaft may be replaced when the bushings to be trimmed are of different sizes.

7. A machine as defined in claim 5 in which the cutter carried by said rotatable member and the means to adjust the position of said cutter include a cutter holder slidably received in an opening extending at one side of the axis of the rotatable member and transversely thereof, said holder supporting the cutter with the latter extending exteriorly of said opening and beyond the surface of said rotatable member, and means cooperating with said holder to slide the latter in said opening for adjusting the position of the cutter.

8. A machine tool of the character described comprising two rotatable members, means carried by one of said members for positioning a workpiece thereon, a material removing means carried by said workpiece positioning means and adapted to engage a portion of a workpiece positioned thereon, a second material removing means carried by the other rotatable member and adapted to engage a different portion of a workpiece positioned on the first-mentioned means, and means to simultaneously rotate said members in opposite directions including separate driven friction gears connected with each of said members, a single friction driving gear cooperating with each of said driven gears, and means to adjust one of said driven gears relative to said driving gear to vary the speed of rotation of one of said members relative to the speed of the other of said members so that the torque exerted upon said workpiece by one of the material removing means is balanced by the torque exerted upon the workpiece by the other of said material removing means.

EARL L. ERB.

REFERENCES CITED

The following references are of record in the file of this patent:

UNITED STATES PATENTS

| Number | Name | Date |
|---|---|---|
| 1,723,999 | Bernard | Aug. 13, 1929 |
| 1,948,139 | Smitmons | Feb. 20, 1934 |
| 1,967,559 | Schreck | July 24, 1934 |
| 2,070,537 | Matthews | Feb. 9, 1937 |
| 2,217,144 | Stewart | Oct. 8, 1940 |
| 2,250,670 | Joy | July 29, 1941 |